(12) United States Patent
Suzuki et al.

(10) Patent No.: US 12,222,527 B2
(45) Date of Patent: Feb. 11, 2025

(54) LIGHT DIFFUSION FILM

(71) Applicant: KIMOTO CO., LTD., Saitama (JP)

(72) Inventors: Sho Suzuki, Saitama (JP); Tatsuya Kato, Saitama (JP); Kazutoshi Tachibana, Saitama (JP)

(73) Assignee: KIMOTO CO., LTD., Saitama (JP)

( * ) Notice: Subject to any disclaimer, the term of this patent is extended or adjusted under 35 U.S.C. 154(b) by 394 days.

(21) Appl. No.: 17/636,179

(22) PCT Filed: Sep. 23, 2020

(86) PCT No.: PCT/JP2020/035798
§ 371 (c)(1),
(2) Date: Feb. 17, 2022

(87) PCT Pub. No.: WO2021/084977
PCT Pub. Date: May 6, 2021

(65) Prior Publication Data
US 2022/0299682 A1 Sep. 22, 2022

(30) Foreign Application Priority Data

Oct. 31, 2019 (JP) ................................. 2019-199004

(51) Int. Cl.
*G02B 5/02* (2006.01)

(52) U.S. Cl.
CPC ............. *G02B 5/02* (2013.01); *G02B 5/0268* (2013.01)

(58) Field of Classification Search
CPC ...... G02B 5/02; G02B 5/0268; G02B 5/0226; G02B 5/0242; G02B 5/0236; G02B 5/0205; G02B 5/0221; G02B 1/04; F21V 3/02; G02F 1/133504; G02F 1/133606
See application file for complete search history.

(56) References Cited

U.S. PATENT DOCUMENTS

| 2008/0137204 A1* | 6/2008 | Yoshinari ............. G02B 5/0294 428/212 |
| 2011/0317099 A1 | 12/2011 | Fuchida et al. |

(Continued)

FOREIGN PATENT DOCUMENTS

| JP | 2001 311806 A | 11/2001 |
| JP | 2001 311807 A | 11/2001 |

(Continued)

OTHER PUBLICATIONS

Machine translation of WO-2012026429-A1 (Year: 2012).*

(Continued)

*Primary Examiner* — Darryl J Collins
*Assistant Examiner* — Matthew Y Lee
(74) *Attorney, Agent, or Firm* — BACON & THOMAS, PLLC

(57) ABSTRACT

There is provided a light diffusion film in which a decrease in the half-value angle can be suppressed even after processing with a high elongation rate. A light diffusion film including a base material film and a light diffusing layer, the light diffusing layer containing light diffusing particles and a resin binder, wherein a ratio (T/t) of an average film thickness T of the light diffusing layer, to an average particle diameter t of the light diffusing particles, is 3.0 or more.

10 Claims, 5 Drawing Sheets

(56) References Cited

U.S. PATENT DOCUMENTS

| | | | | |
|---|---|---|---|---|
| 2013/0181206 A1* | 7/2013 | Nagase | ................ | H10K 50/858 |
| | | | | 257/40 |
| 2013/0242241 A1* | 9/2013 | Nishimura | ........... | G02B 5/0278 |
| | | | | 359/493.01 |
| 2016/0077247 A1 | 3/2016 | Nakamura et al. | | |
| 2020/0116905 A1 | 4/2020 | Mitani et al. | | |
| 2020/0355964 A1 | 11/2020 | Yonezawa et al. | | |

FOREIGN PATENT DOCUMENTS

| | | | | | |
|---|---|---|---|---|---|
| JP | 2012068273 A | * | 4/2012 | | |
| JP | 2018 041638 A | | 3/2018 | | |
| WO | 2010 106990 A1 | | 9/2010 | | |
| WO | 2010 110103 A1 | | 9/2010 | | |
| WO | WO-2010113741 A1 | * | 10/2010 | ......... | B29C 47/0021 |
| WO | 2012 036272 A1 | | 3/2012 | | |
| WO | 2012 039319 A1 | | 3/2012 | | |
| WO | WO-2012026429 A1 | * | 3/2012 | ....... | G02F 1/133504 |
| WO | 2014 067664 A2 | | 5/2014 | | |
| WO | 2019 102715 A1 | | 5/2019 | | |

OTHER PUBLICATIONS

Machine translation of JP-2012068273-A (Year: 2012).*
Machine translation of WO-2010113741-A1 (Year: 2010).*
Search Report dated Oct. 27, 2020, issued in corresponding PCT application No. PCT/JP2020/035798.

* cited by examiner

LIGHT DIFFUSION FILM

TECHNICAL FIELD

The present invention relates to a light diffusion film.

BACKGROUND ART

Conventionally, as light emitting apparatuses that can emit high energy light with power saving, apparatuses using light emitting diodes (LEDs) are known. Light emitted from LEDs has strong directivity, and therefore the light is required to be highly dispersed. The apparatuses using light emitting diodes are used as LED lighting apparatuses for automobile lights, refrigerators, microwave ovens, indoor lights, and the like. A particularly high degree of dispersibility is required of LED lighting apparatuses (for example, Patent Literature 1).

CITATION LIST

Patent Literature

[Patent Literature 1] Japanese Patent Laid-Open No. 2018-041638

SUMMARY OF INVENTION

Technical Problem

For the purpose of diffusing light, a light diffusion film is used. As an indicator for evaluating the diffusivity of light in a light diffusion film, haze may be used. However, in LED lighting apparatuses, satisfactory light diffusivity has not been obtained even with a light diffusion film that exhibits high haze, in some cases. Accordingly, as an indicator of light diffusivity in an LED lighting apparatus, a half-value angle is used. The half-value angle (°) is the angle at intensity $I_{1/2}$ half the intensity $I_0$ of front light that is transmitted through a light diffusion film and is at a light source angle of 0°. That is, in LED lighting apparatuses, a light diffusion film that exhibits a wide half-value angle (°) is required.

On the other hand, LED lighting apparatuses have a high degree of freedom in design, and many lighting apparatuses having new shapes are announced. Meanwhile, a degree of freedom in shape is also required of the components, such as covers, of LED lighting apparatuses, and in shaping from a flat sheet shape, a curved surface having a high radius of curvature, and a flat surface that has a high elongation rate during shaping may be present. It has become clear that when a light diffusion film is shaped in order to meet the demand, a problem is that the light diffusion performance of the light diffusion film decreases in the case of having a high radius of curvature and in a portion having a high elongation rate. Particularly, when a light diffusion film is elongated, the half-value angle decreases easily even if the decrease in haze is slight.

Accordingly, it is an object of the present invention to provide a light diffusion film in which a decrease in the half-value angle can be suppressed even after processing with a high elongation rate.

Solution to Problem

The present inventors have found that a light diffusion film in which a decrease in the half-value angle can be suppressed even after processing with a high elongation rate can be obtained by using a light diffusion film including a light diffusing layer containing light diffusing particles and a resin binder, with the ratio (T/t) of the average film thickness T of the light diffusing layer to the average particle diameter t of the light diffusing particles, being 3.0 or more.

That is, the present invention relates to the following [1] to [5]:

[1] A light diffusion film including a base material film and a light diffusing layer, the light diffusing layer containing light diffusing particles and a resin binder,
wherein a ratio of an average film thickness of the light diffusing layer, T, to an average particle diameter of the light diffusing particles, t, (T/t), is 3.0 or more.

[2] The light diffusion film according to [1], wherein a half-value angle of the light diffusion film at an elongation rate of 40%, $H_{40}$, is within a range of a value 25% lower than a value of a half-value angle before elongation, $H_0$, or more and a value 25% higher than the value of the half-value angle before elongation, $H_0$, or less.

[3] The light diffusion film according to [1] or [2], wherein an amount of the light diffusing particles loaded is 30% by mass or more and 80% by mass or less based on a total amount of solids in the light diffusing layer.

[4] The light diffusion film according to any one of [1] to [3], wherein the light diffusing particles have an average particle diameter t of 0.5 to 10.0 μm.

[5] The light diffusion film according to any one of [1] to [4], wherein the light diffusing layer has an average film thickness T of 1.5 to 30 μm.

Advantageous Effect of Invention

Accordingly, according to the present invention, it is possible to provide a light diffusion film in which a decrease in the half-value angle can be suppressed even after processing with a high elongation rate.

DESCRIPTION OF EMBODIMENTS

Figure 1:
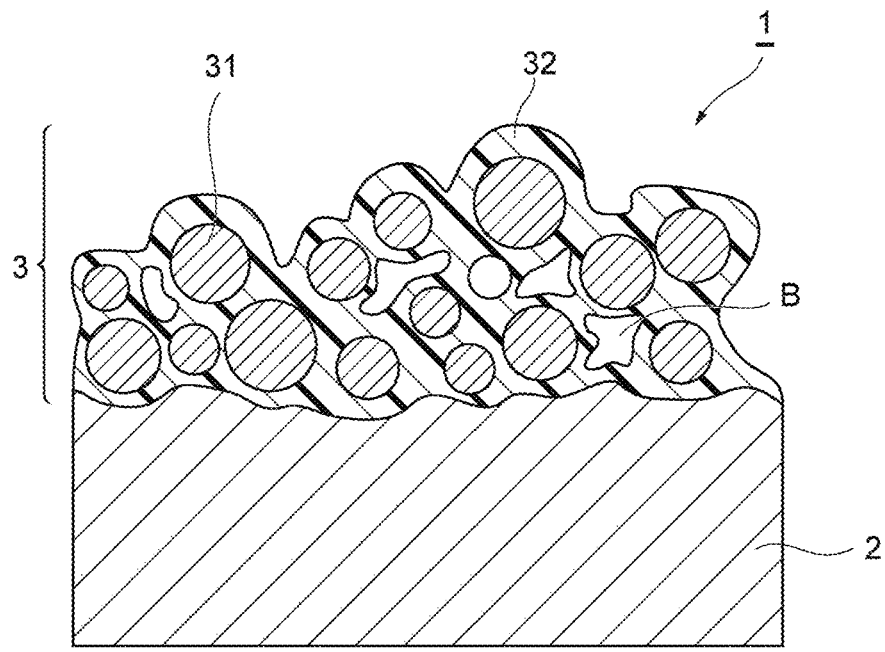
FIG. 1 is a schematic cross-sectional view of the light diffusion film 1 of this embodiment.

Embodiments of the present invention will be described in detail below with reference to the drawings. Positional relationships such as the top, bottom, left, and right are based on the positional relationships shown in the drawings unless otherwise noted. The dimensional ratios in the drawings are not limited to the ratios shown. However, the following embodiments are illustrations for explaining the present invention, and the present invention is not limited to these and can be carried out by making arbitrary changes without departing from the spirit thereof. As used herein, for example, the description of a numerical value range as "1 to 100" includes both its lower limit value "1" and upper limit value "100". The same applies to the description of other numerical value ranges.

A light diffusion film according to this embodiment includes a base material film and a light diffusing layer, the light diffusing layer containing light diffusing particles and a resin binder. In this embodiment, the ratio (T/t) (hereinafter also simply referred to as a "T/t ratio") of the average film thickness T of the light diffusing layer to the average particle diameter t of the light diffusing particles, is 3.0 or more. According to the light diffusion film according to this embodiment, a decrease in the half-value angle can be suppressed even after processing with a high elongation rate.

FIG. 1 is a schematic cross-sectional view of the light diffusion film 1 of this embodiment. The light diffusion film 1 of this embodiment includes a base material film 2 and a light diffusing layer 3 provided on one surface 2a side of this base material film 2. In the light diffusion film 1, the light diffusing layer 3 is exposed on the outermost surface. Since the light diffusing layer 3 is exposed on the outermost surface in this manner, irregularities are easily formed on the surface of the light diffusing layer 3 by elongating the light diffusion film 1, and the half-value angle after elongation is easily maintained.

The light diffusing layer 3 contains light diffusing particles 31 and a resin 32. The light diffusing layer 3 has voids B inside. Since the light diffusing layer 3 has a T/t ratio in the predetermined value or more, the light diffusing particles 31 are formed so as to stack in the thickness direction of the light diffusing layer 3.

Next, a method for using the light diffusion film 1 will be described. The light diffusion film 1 of this embodiment is used, for example, by being subjected to shaping processing under heating conditions according to the curved surface shape of a transparent component surface. In the shaping processing, the light diffusion film 1 elongates according to the shape of the curved surface. In the light diffusion film 1 according to this embodiment, the half-value angle due to the light diffusion of the light diffusion film can be maintained even with the elongation.

As shown in FIG. 1, when the light diffusion film 1 does not elongate, light is diffused by the light diffusing particles 31 and the voids B in the light diffusing layer 3 and the interface at the surface. Among these elements that perform light diffusion, the extent of the contribution of the light diffusing particles 31 in the light diffusing layer 3 to the diffusion of light is large.

Figure 2:
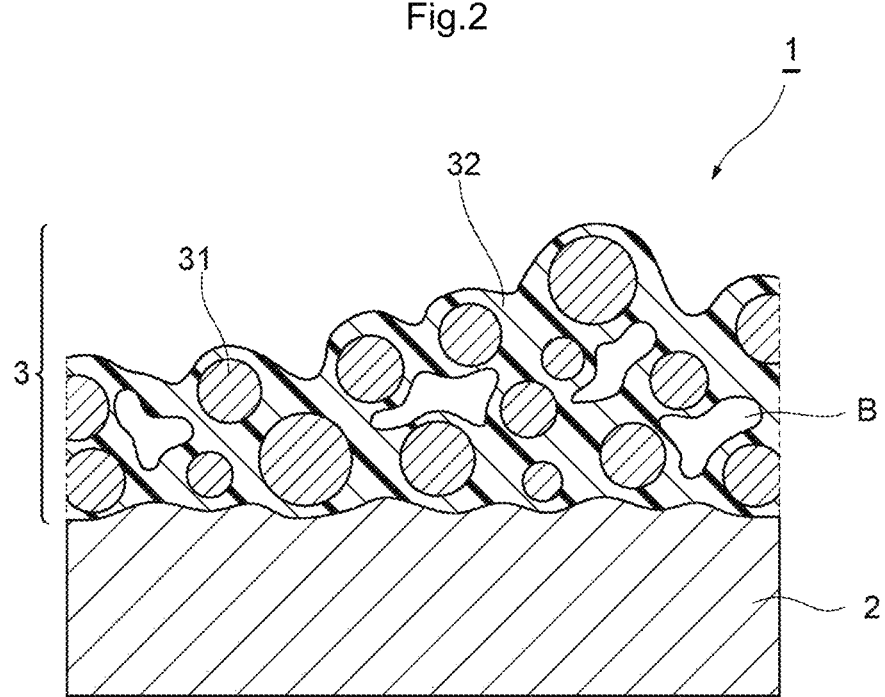
FIG. 2 is a schematic cross-sectional view of the light diffusion film 1 of this embodiment when it is elongated.

FIG. 2 is a schematic cross-sectional view of the light diffusion film 1 of this embodiment when it is elongated. When the light diffusion film 1 is elongated, the film thickness of the light diffusing layer 3 decreases, and the contribution of the light diffusing particles 31 to light diffusion also decreases somewhat, but the voids B inside the light diffusion film 1 enlarge, and the contribution to light diffusion increases. The contribution of the light diffusing particles 31 to light diffusion decreases as the elongation rate increases. But the size of the voids B also increases as the elongation rate increases, and the contribution to light diffusion also increases. In this manner, the light diffusivity before and after elongation is maintained.

Figure 3:
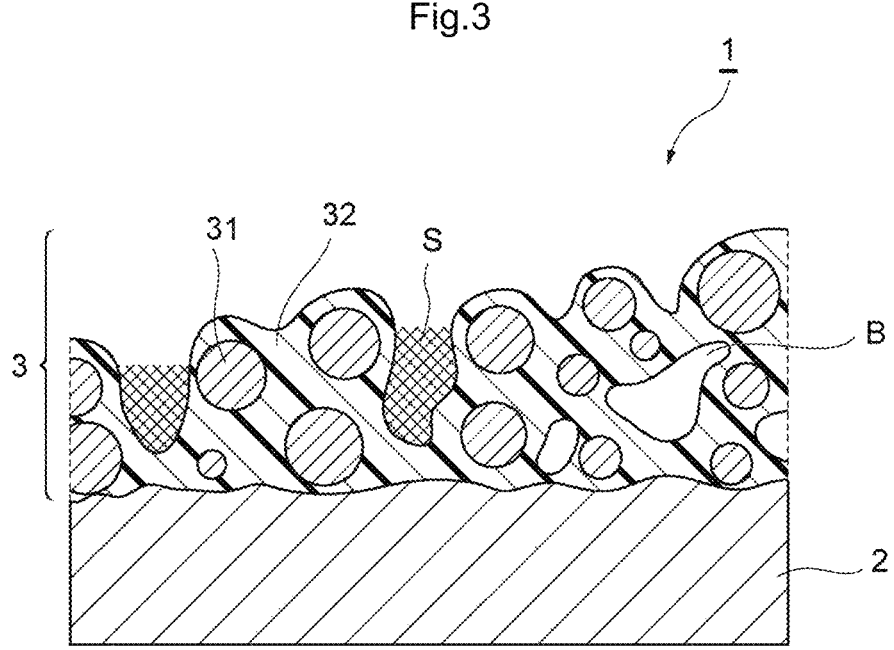
FIG. 3 is a schematic cross-sectional view of the light diffusion film 1 of this embodiment when it is further elongated.

FIG. 3 is a schematic cross-sectional view of the light diffusion film 1 of this embodiment when the light diffusion film 1 is further elongated. When the light diffusion film 1 is further elongated, the film thickness of the light diffusing layer 3 decreases, and the contribution of the light diffusing particles 31 to light diffusion decreases further. But in addition to the enlargement of the voids B inside the light diffusion film 1, the number of the voids B also increases, which is not shown, and further, depressed portions S are formed on the surface of the light diffusing layer 3. The depressed portions S are formed by the collapse of the light diffusing layer 3. Since the value of T/t is equal to or more than the predetermined value, the roughness of the surface due to the exposure of the light diffusing particles 31, and the roughness of the surface due to the formation of the depressed portions S themselves are formed, thus contributing to an increase in light diffusivity. In this manner, when the light diffusion film 1 is further elongated, elements in which the light diffusivity decreases, and elements in which the light diffusivity increases coexist, and thus the light diffusivity before and after elongation is maintained.

Figure 4:
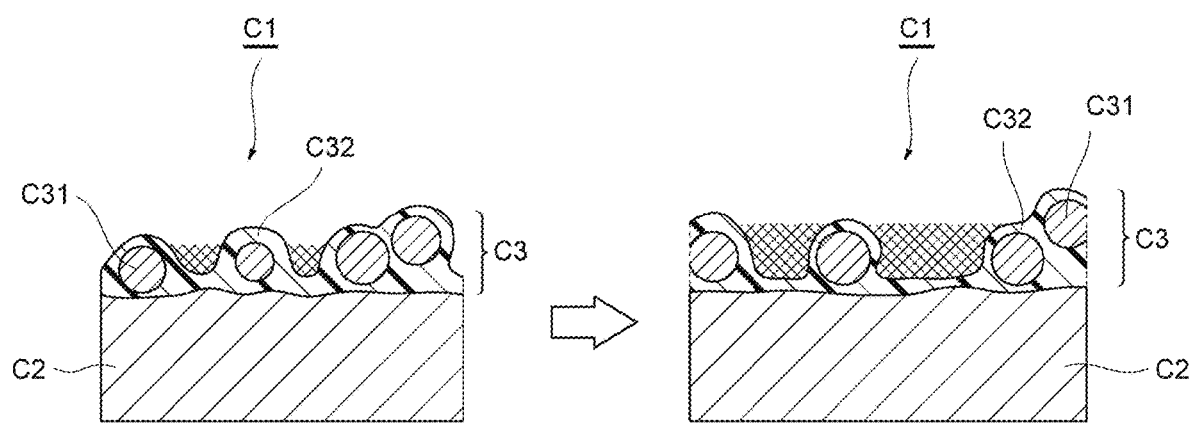
FIG. 4 is a schematic cross-sectional view showing the action when a conventional light diffusion film C1 is elongated.

FIG. 4 is a schematic cross-sectional view showing the action when a conventional light diffusion film C1 is elongated. Here, as conventional art, the light diffusion film C1 will be described. The light diffusion film C1 has, for example, a T/t equal to or less than the predetermined value. The light diffusion film C1 includes a light diffusing layer C3 containing light diffusing particles C31 and a resin binder 32. When the light diffusion film C1 is elongated, the contribution of the light diffusing particles C31 to light diffusion decreases. The size of the depressed portions is enlarged by the elongation, but the contribution of the depressed portions to light diffusion decreases.

Moreover, the film thickness of the light diffusion film C1 is not large, and therefore few voids in the light diffusing layer C3 are formed, and even if the light diffusion film C1 is elongated, the contribution of the enlargement of voids B to light diffusion is also small. For the above reasons, according to the diffusing film C1, the contribution of the elements that contribute to light diffusion decreases by elongation, and therefore the light diffusivity decreases between before and after elongation.

<T/t Ratio>

The ratio (T/t) of the average film thickness T of the light diffusing layer to the average particle diameter t of the light diffusing particles, in the light diffusion film according to this embodiment is 3.0 or more. With the T/t ratio in this range, a light diffusion film in which a decrease in the half-value angle can be suppressed even after processing with a high elongation rate is obtained. The T/t ratio is preferably 3.0 or more, more preferably 3.3 or more, and further preferably 3.8 or more. When the T/t ratio is equal to or more than the lower limit value, the light diffusing particles easily overlap each other in the light diffusing layer, and the half-value angle tends to be easily maintained even when the light diffusion film is elongated. The upper limit value of the T/t ratio is not particularly limited, but the T/t ratio is preferably 20.0 or less, more preferably 15.0 or less, and further preferably 10.0 or less. When the T/t ratio is equal to or less than the upper limit value, the light diffusing layer is easily formed, and the half-value angle is easily maintained even when the light diffusion film is elongated.

The average particle diameter of the light diffusing particles, t, is preferably 0.5 to 10.0 µm, more preferably 1.0 to 8.0 µm, further preferably 1.0 to 5.0 µm, and further preferably 1.0 to 3.0 µm. When the average particle diameter of the light diffusing particles, t, is within the range, the half-value angle of the light diffusion film improves. When the average particle diameter t is within the range of 1.0 to 3.0 µm, the half-value angle of the light diffusion film particularly increases.

The average particle diameter t of the light diffusing particles, herein means a median diameter (Do) measured by a laser diffraction type particle size distribution measuring apparatus (for example, trade name "SALD-7000" manufactured by SHIMADZU CORPORATION). The median diameter (Do) means the particle diameter when the amount of particles is 50% by volume when cumulatively calculated from the small particle diameter side in the particle distribution.

The average film thickness T of the light diffusing layer, is preferably 1.5 to 30 μm, more preferably 3 to 20 μm, and further preferably 5 to 15 μm. When the average film thickness of the light diffusing layer, T, is included in the range, a decrease in the half-value angle due to processing with a high elongation rate can be more suppressed. The method for measuring the average film thickness T herein is based on a measurement method described in Examples.

The amount of the light diffusing particles loaded in the light diffusing layer is preferably 30% by mass or more and 80% by mass or less, more preferably 50% by mass or more and 75% by mass or less, further preferably 65% by mass or more and 70% by mass or less, and still further preferably 65% by mass or more and 68% by mass or less based on the total amount of solids in the light diffusing layer. When the amount of the light diffusing particles loaded is in the range, many light diffusing particles are loaded in the light diffusing layer, and by elongating the light diffusion film, irregularities are easily formed on the surface of the light diffusing layer, and the half-value angle is easily maintained.

The light diffusing particles in the light diffusing layer are preferably included in an amount of 40 parts by mass or more and 400 parts by mass or less, more preferably 100 parts by mass or more and 300 parts by mass or less, further preferably 180 parts by mass or more and 240 parts by mass or less, and still further preferably 200 parts by mass or more and 240 parts by mass or less based on 100 parts by mass of the resin binder. When the amount of the light diffusing particles is in the range, many light diffusing particles are loaded in the light diffusing layer, and by elongating the light diffusion film, irregularities are easily formed on the surface of the light diffusing layer, and the half-value angle is easily maintained.

The difference $|I_p - I_r|$ between the refractive index $I_p$ of the light diffusing particles and the refractive index $I_r$ of the resin binder, is preferably 0.01 to 0.50, more preferably 0.05 to 0.40, and further preferably 0.10 to 0.30. By increasing the difference $|I_p - I_r|$, the internal diffusion in the light diffusing layer can be increased, but the value of the difference $|I_p - I_r|$ is appropriately set according to the assumed elongation rate and the extent of surface diffusion at the elongation rate so that the half-value angle is maintained before and after elongation. The refractive index $I_p$ is preferably a value higher than the refractive index $I_r$.

The half-value angle of the light diffusion film at an elongation rate of 0%, $H_0$, is preferably 10° or more, more preferably 20° or more, further preferably 30° or more, and still further preferably 40° or more. The upper limit value of the half-value angle $H_0$ is not particularly limited, but the half-value angle $H_0$ may be, for example, 70° or less or 60° or less.

The half-value angle of the light diffusion film at an elongation rate of 40%, $H_{40}$, is preferably 10° or more, more preferably 20° or more, further preferably 30° or more, and still further preferably 40° or more. The upper limit value of the half-value angle $H_{40}$ is not particularly limited, but the half-value angle $H_{40}$ may be, for example, 70° or less or 60° or less.

The half-value angle of the light diffusion film at an elongation rate of 60%, $H_{60}$, is preferably 10° or more, more preferably 20° or more, further preferably 30° or more, and still further preferably 40° or more. The upper limit value of the half-value angle $H_{60}$ is not particularly limited, but the half-value angle $H_{60}$ may be, for example, 70° or less or 60° or less.

The half-value angle of the light diffusion film at an elongation rate of 80%, $H_{80}$, is preferably 10° or more, more preferably 20° or more, further preferably 30° or more, and still further preferably 40° or more. The upper limit value of the half-value angle $H_{80}$ is not particularly limited, but the half-value angle $H_{80}$ may be, for example, 70° or less or 60° or less.

The half-value angle of the light diffusion film at an elongation rate of 120%, $H_{120}$, is preferably 10° or more, more preferably 20° or more, further preferably 30° or more, and still further preferably 40° or more. The upper limit value of the half-value angle $H_{120}$ is not particularly limited, but the half-value angle $H_{120}$ may be, for example, 70° or less or 60° or less.

The half-value angle of the light diffusion film at an elongation rate of 40%, $H_{40}$, is preferably within the range of a value 25% lower than the value of the half-value angle before elongation, $H_0$, or more and a value 25% higher than the value of the half-value angle before elongation, $H_0$, or less, more preferably within the range of a value 20% lower than the value of the half-value angle before elongation, $H_0$, or more and a value 20% higher than the value of the half-value angle before elongation, $H_0$, or less, further preferably within the range of a value 15% lower than the value of the half-value angle before elongation, $H_0$, or more and a value 20% higher than the value of the half-value angle before elongation, $H_0$, or less, and still further preferably within the range of a value 10% lower than the value of the half-value angle before elongation, $H_0$, or more and a value 20% higher than the value of the half-value angle before elongation, $H_0$, or less.

The half-value angle of the light diffusion film at an elongation rate of 60%, $H_{60}$, is preferably within the range of a value 25% lower than the value of the half-value angle before elongation, $H_0$, or more and a value 25% higher than the value of the half-value angle before elongation, $H_0$, or less, more preferably within the range of a value 20% lower than the value of the half-value angle before elongation, $H_0$, or more and a value 20% higher than the value of the half-value angle before elongation, $H_0$, or less, further preferably within the range of a value 15% lower than the value of the half-value angle before elongation, $H_0$, or more and a value 20% higher than the value of the half-value angle before elongation, $H_0$, or less, and still further preferably within the range of a value 10% lower than the value of the half-value angle before elongation, $H_0$, or more and a value 20% higher than the value of the half-value angle before elongation, $H_0$, or less.

The half-value angle of the light diffusion film at an elongation rate of 80%, $H_{80}$, is preferably within the range of a value 25% lower than the value of the half-value angle before elongation, $H_0$, or more and a value 25% higher than the value of the half-value angle before elongation, $H_0$, or less, more preferably within the range of a value 20% lower than the value of the half-value angle before elongation, $H_0$, or more and a value 20% higher than the value of the half-value angle before elongation, $H_0$, or less, further preferably within the range of a value 15% lower than the value of the half-value angle before elongation, $H_0$, or more and a value 20% higher than the value of the half-value angle before elongation, $H_0$, or less, and still further preferably within the range of a value 10% lower than the value of the half-value angle before elongation, $H_0$, or more and a value 20% higher than the value of the half-value angle before elongation, $H_0$, or less.

The half-value angle of the light diffusion film at an elongation rate of 120%, $H_{120}$, is preferably within the range of a value 25% lower than the value of the half-value angle before elongation, $H_0$, or more and a value 25% higher than the value of the half-value angle before elongation, $H_0$, or less, more preferably within the range of a value 20% lower than the value of the half-value angle before elongation, $H_0$, or more and a value 20% higher than the value of the half-value angle before elongation, $H_0$, or less, further preferably within the range of a value 15% lower than the value of the half-value angle before elongation, $H_0$, or more and a value 20% higher than the value of the half-value angle before elongation, $H_0$, or less, and still further preferably within the range of a value 10% lower than the value of the half-value angle before elongation, $H_0$, or more and a value 20% higher than the value of the half-value angle before elongation, $H_0$, or less.

The elongation rate of the light diffusion film herein is a ratio represented by the following formula (1):

elongation rate (%)=[length after elongation−length before elongation]/[length before elongation]× 100 (1)

The elongation conditions and the half-value angle (°) herein are based on the test method described in Examples.

<Base Material Film>

The base material film preferably contains a thermoplastic resin. Examples of the resin constituting the base material film include polycarbonate resins, polyethylene terephthalate resins, polybutylene terephthalate resins, polyethylene naphthalate resins, acrylic resins, polyvinyl chloride resins, polyethylene resins, polypropylene resins, polystyrene resins, polyurethane resins, triacetyl cellulose resins, and norbornene resins. One of these may be used alone, or two or more of these may be used in combination. Among these, the base material film preferably includes at least one selected from the group consisting of polycarbonate resins, polyethylene terephthalate resins, polyacrylic resins, polyvinyl chloride resins, and polyurethane resins, more preferably a polycarbonate resin.

The base material film is preferably a nonstretched film not subjected to stretching processing, particularly biaxial stretching processing, from the viewpoint of subjecting the light diffusion film to stretching processing. Here, when the base material film is rolled, stretching may be slightly applied, but the base material film is included in the nonstretched film herein when not subjected to stretching processing or biaxial stretching processing.

The base material film may be a base material film in which a surface is subjected to corona discharge treatment, or an easily adhesive layer is provided on a surface, in order to improve adhesiveness to the light diffusing layer.

The glass transition temperature of the resin of the base material film is preferably 100 to 200° C., more preferably 120 to 180° C., and further preferably 140 to 155° C. When the glass transition temperature of the resin of the base material film is in the range, stretching processing under heating conditions is easily performed.

The thickness of the base material film is preferably 10 to 500 μm, more preferably 100 to 400 μm, and further preferably 150 to 300 μm.

<Light Diffusing Layer>

The light diffusing layer includes light diffusing particles and a resin binder.

(Light Diffusing Particles)

The light diffusing particles according to this embodiment are blended in order to diffuse light in the light diffusing layer. In this embodiment, the light diffusing particles mean particles having an average particle diameter of 0.4 μm or more. Here, the average particle diameter can be measured by the same method as the average particle diameter t.

The light diffusing particles are preferably particles having a glass transition temperature higher than the glass transition temperature of the resin of the base material film, more preferably thermoplastic resin particles having the glass transition temperature or thermosetting resin particles. When the light diffusing particles are thermoplastic resin particles, the melting temperature of the thermoplastic resin particles is preferably a temperature 20° C. higher than the glass transition temperature of the resin of the base material film, more preferably a temperature 40° C. higher than the glass transition temperature of the resin of the base material film, and further preferably a temperature 50° C. higher than the glass transition temperature of the resin of the base material film. By using the thermoplastic resin particles, or thermosetting resin particles, the shape of the light diffusing particles can be maintained when the light diffusion film is stretched under heating temperature conditions, and the half-value angle maintenance rate after stretching can be increased.

Examples of the resin used for the light diffusing particles include benzoguanamine resins, acrylic resins, styrene resins, urethane resins, nylon resins, silicone resins, melamine resins, epoxy resins, polycarbonate resins, and thiophene resins. One of these may be used alone, or two or more of these may be used in combination. Among these, benzoguanamine resins, acrylic resins, styrene resins, and melamine resins are preferable. The light diffusing particles may be solid particles or hollow particles.

The light diffusing particles may contain an inorganic oxide such as silica or alumina, an ultraviolet absorbing agent, and other components.

The average particle diameter of the light diffusing particles, t, is as described above.

The light diffusing particles may have a high refractive index or a low refractive index. In the case of a high refractive index, the refractive index of the light diffusing particles is preferably 1.40 to 1.70, more preferably 1.50 to 1.70, and further preferably 1.55 to 1.70. In the case of a low refractive index, the refractive index of the light diffusing particles is preferably 1.26 to 1.36, more preferably 1.28 to 1.34, and further preferably 1.30 to 1.32.

(Resin Binder)

The resin binder may be a thermoplastic resin or a thermosetting resin but preferably includes a thermoplastic resin. Examples of the thermoplastic resin include ABS resins, norbornene resins, silicone resins, nylon resins, polyvinyl acetal resins, polycarbonate resins, modified polyphenylene ether resins, polybutylene terephthalate resins, polyethylene terephthalate resins, sulfone resins, imide resins, fluororesins, styrene resins, acrylic resins, vinyl chloride resins, vinyl acetate resins, vinyl chloride-vinyl acetate copolymer resins, polyester resins, urethane resins, rubber resins, polyvinyl ether resins, polyvinyl alcohol resins, polyvinyl butyral resins, polyvinylpyrrolidone resins, and polyethylene glycol resins. One of these may be used alone, or two or more of these may be used in combination. The thermoplastic resins binder preferably includes at least one selected from the group consisting of polyvinyl chloride resins, polyvinylidene chloride resins, polyvinyl alcohol resins, polyvinyl acetal resins, polyvinyl butyral resins, polystyrene resins, acrylic resins, urethane resins, silicone resins, and fluororesins, more preferably at least one selected from the group consisting of polyvinyl acetal resins and acrylic resins.

The glass transition temperature of the resin of the resin binder is preferably a temperature lower than the glass transition temperature of the resin of the base material film, more preferably 80 to 200° C., further preferably 90 to 150° C., and still further preferably 100 to 120° C.

The content of the resin binder is preferably 25% by mass or more and 70% by mass or less, more preferably 30% by mass or more and 50% by mass or less, and further preferably 32% by mass or more and 35% by mass or less based on the total amount of solids in the light diffusing layer.

The content of the thermoplastic resin is preferably 60% by mass or more and 100% by mass or less, more preferably 70% by mass or more and 100% by mass or less, and further preferably 80% by mass or more and 100% by mass or less based on the total amount of the resin binder.

The light diffusing layer according to this embodiment may include inorganic particles having an average particle diameter of less than 0.4 μm (hereinafter also simply referred to as "inorganic fine particles"). Here, the average particle diameter can be measured by the same method as the average particle diameter t. When the average particle diameter is less than 0.4 on, there is little contribution to light diffusivity. The inorganic fine particles are preferably inorganic oxide fine particles.

The inorganic fine particles are used, for example, for the adjustment of the refractive index. In that case, the refractive index of the inorganic fine particles is preferably 1.9 or more, more preferably 2.0 or more, and further preferably 2.3 or more. Examples of the inorganic oxide included in the inorganic oxide fine particles include lead hydroxycarbonate ($2PbCO_3Pb(OH)_2$) (refractive index 1.94 to 2.09), titanium oxide (refractive index 2.71), zirconium oxide (refractive index 2.4), zinc oxide (refractive index 1.95), and aluminum oxide (refractive index 1.76). One of these may be used alone, or two or more of these may be used in combination.

The inorganic fine particles may assume a white color. By using inorganic fine particles that assume a white color, the light diffusion film assumes a white color, which can increase the effect of reducing brightness unevenness around the light source of a backlight apparatus and making light leakage at the ends of the light guide plate inconspicuous. Examples of the inorganic fine particles that assume a degree of whiteness include zirconium oxide, titanium oxide, and zinc oxide. One of these may be used alone, or two or more of these may be used in combination. Among these, zirconium oxide and titanium oxide are preferable.

The primary particle diameter of the inorganic fine particles is preferably 10 to 50 nm. Most of such particles on the order of nm are included in the light diffusing layer as aggregates in a state of being dispersed in the light diffusing layer.

The content of the inorganic fine particles is preferably 40 to 500 parts by mass, more preferably 120 to 300 parts by mass, and further preferably 160 to 240 parts by mass based on 100 parts by mass of the resin binder.

The light diffusing layer may contain, in addition, additives such as surfactants such as a leveling agent and an antifoaming agent, an antioxidant, and an ultraviolet absorbing agent.

<Other Properties of Light Diffusion Film>

(Total Light Transmittance)

The total light transmittance of the light diffusion film at an elongation rate of 0%, $Tt_0$, is preferably 50% or more, more preferably 60% or more, further preferably 65% or more, and still further preferably 70% or more. The upper limit value of the total light transmittance $Tt_0$ is not particularly limited, but the total light transmittance $Tt_0$ may be, for example, less than 99%, less than 95%, less than 85%, or less than 80%.

The total light transmittance of the light diffusion film at an elongation rate of 120%, $Tt_{120}$, is preferably 50% or more, more preferably 60% or more, further preferably 65% or more, and still further preferably 70% or more. The upper limit value of the total light transmittance $Tt_{120}$ is not particularly limited, but the total light transmittance $Tt_{120}$ may be, for example, less than 99%, less than 95%, less than 90%, less than 85%, less than 80%, or less than 70%.

The total light transmittance can be measured by a method in accordance with JIS K7361-1: 1997.

(Haze)

The haze of the light diffusion film at an elongation rate of 0%, $Hz_0$, is preferably 90%, more preferably 95%, further preferably 96%, and still further preferably 97%. The upper limit value of the haze $Hz_0$ is not particularly limited, but the haze $Hz_0$ may be, for example, less than 100%.

The haze of the light diffusion film at an elongation rate of 120%, $Hz_{120}$, is preferably 90%, more preferably 95%, further preferably 97%, and still further preferably 98%. The upper limit value of the haze $Hz_{120}$ is not particularly limited, but the haze $Hz_{120}$ may be, for example, less than 100%.

The haze can be measured by a method in accordance with JIS K7136: 2000.

(Arithmetic Mean Roughness (Ra))

The arithmetic mean roughness of the light diffusion film at an elongation rate of 0%, $Ra_0$, is preferably 1000 nm or less, more preferably 800 nm or less, and further preferably 600 nm or less. The lower limit value of the arithmetic mean roughness $Ra_0$ is not particularly limited but may be 200 nm.

The arithmetic mean roughness of the light diffusion film at an elongation rate of 120%, $Ra_{120}$, is preferably 1500 nm or less, more preferably 1000 nm or less, and further preferably 800 nm or less. The lower limit value of the arithmetic mean roughness $Ra_{120}$ is not particularly limited but may be 300 nm.

When the light diffusion film has an arithmetic mean roughness (Ra) in this range, the balance between surface diffusion and internal diffusion is well kept, and the half-value angle is easily maintained. The arithmetic mean roughness (Ra) can be obtained by an atomic force microscope "Nanocute system" (product name, manufactured by Hitachi High-Tech Science Corporation, probe: Si single crystal probe, measurement mode: DFM mode, image processing: one flat processing (XY))) by a measurement method in accordance with JIS B0601: 2001.

[Method for Manufacturing Light Diffusion Film]

The method for manufacturing the light diffusion film is not particularly limited, but it is obtained, for example, by applying an application liquid including light diffusing particles and a resin binder onto a base material film. The amounts of the light diffusing particles and the resin binder included in the application liquid are as described above, and these components are diluted with a solvent, adjusted to a suitable viscosity, and applied onto the base material film.

[Method for Using Light Diffusion Film]

The light diffusion film is disposed on a surface of a transparent member. Examples of the method for using the light diffusion film include
(a) a preforming method in which the light diffusion film is pressure-bonded to a surface of a transparent member,
(b) an insert molding method in which the light diffusion film is disposed inside a mold, and a resin for a transparent member is poured inside the light diffusion film and shaped, and
(c) a three-dimensional surface decoration shaping method in which the light diffusion film is pressurized on one surface side of a transparent member in a noncontact mode under reduced pressure conditions and thus laminated on the adherend.

The three-dimensional surface decoration shaping method can be performed, for example, by a TOM shaping machine "NGF-5012-RS" (manufactured by Fu-se Vacuum Forming Ltd.). Among these, the (b) insert molding method or the (c) three-dimensional surface decoration shaping method are preferable, and the (b) insert molding method is more preferable.

In this embodiment, the temperature (for example, the temperature of the shaping chamber of a decoration shaping machine) when the light diffusion film is laminated on an adherend is preferably 70 to 200° C. The temperature is more preferably 100 to 160° C., further preferably 130 to 160° C. By performing shaping within the temperature range, the light diffusion film conforms to a surface of a resin shaped body, and the light diffusion film is elongated. Even if the resin shaped body has a shape that provides a high elongation rate of 80% or 120% or more, a decrease in the half-value angle due to the shaping can be suppressed with the light diffusion film according to this embodiment.

The light diffusion film according to this embodiment is used, for example, for the light diffusion of an LED lighting apparatus such as an automobile light.

The following embodiments are disclosed herein.

<1> A light diffusion film including a base material film and a light diffusing layer, the light diffusing layer containing light diffusing particles and a resin binder,
wherein a ratio of an average film thickness of the light diffusing layer, T, to an average particle diameter of the light diffusing particles, t, (T/t), is 3.0 or more.

<2> The light diffusion film according to <1>, wherein a half-value angle of the light diffusion film at an elongation rate of 40%, $H_{40}$, is within a range of a value 25% lower than a value of a half-value angle before elongation, $H_0$, or more and a value 25% higher than the value of the half-value angle before elongation, $H_0$, or less.

<3> A light diffusion film including a base material film and a light diffusing layer, the light diffusing layer containing light diffusing particles and a resin binder,
wherein a half-value angle of the light diffusion film at an elongation rate of 40%, $H_{40}$, is within a range of a value 25% lower than a value of a half-value angle before elongation, $H_0$, or more and a value 25% higher than the value of the half-value angle before elongation, $H_0$, or less.

<4> The light diffusion film according to any one of <1> to <3>, wherein a half-value angle of the light diffusion film at an elongation rate of 60%, $H_{60}$, is within the range of the value 25% lower than the value of the half-value angle before elongation, $H_0$, or more and the value 25% higher than the value of the half-value angle before elongation, $H_0$, or less.

<5> The light diffusion film according to any one of <1> to <4>, wherein a half-value angle of the light diffusion film at an elongation rate of 80%, $H_{80}$, is within the range of the value 25% lower than the value of the half-value angle before elongation, $H_0$, or more and the value 25% higher than the value of the half-value angle before elongation, $H_0$, or less.

<6> The light diffusion film according to any one of <1> to <5>, wherein an amount of the light diffusing particles loaded is 30% by mass or more and 80% by mass or less based on a total amount of solids in the light diffusing layer.

<7> The light diffusion film according to any one of <1> to <6>, wherein the amount of the light diffusing particles loaded is 50% by mass or more and 75% by mass or less based on the total amount of solids in the light diffusing layer.

<8> The light diffusion film according to any one of <1> to <7>, wherein the light diffusing particles are included in an amount of 40 parts by mass or more and 250 parts by mass or less based on 100 parts by mass of the resin binder.

<9> The light diffusion film according to any one of <1> to <8>, wherein the light diffusing layer is exposed on an outermost surface.

<10> The light diffusion film according to any one of <1> to <9>, wherein the light diffusing particles include thermosetting resin particles.

<11> The light diffusion film according to any one of <1> to <10>, wherein the resin binder includes a thermoplastic resin.

<12> The light diffusion film according to any one of <1> to <11>, wherein the resin binder includes at least one selected from a group consisting of polyvinyl chloride resins, polyvinylidene chloride resins, polyvinyl alcohol resins, polyvinyl acetal resins, polyvinyl butyral resins, polystyrene resins, acrylic resins, urethane resins, silicone resins, and fluororesins.

<13> The light diffusion film according to any one of <1> to <12>, wherein the light diffusing particles have an average particle diameter t of 0.5 to 10.0 μm.

<14> The light diffusion film according to any one of <1> to <13>, wherein the light diffusing layer has an average film thickness T of 1.5 to 30 μm.

<15> The light diffusion film according to any one of <1> to <14>, wherein the base material film includes at least one selected from a group consisting of polycarbonate resins, polyethylene terephthalate resins, acrylic resins, polyvinyl chloride resins, and urethane resins.

<16> The light diffusion film according to any one of <1> to <15>, wherein a difference between a refractive index of the light diffusing particles, $I_p$, and a refractive index of the resin binder, $I_r$, $|I_p - I_r|$, is 0.01 to 0.5.

<17> The light diffusion film according to any one of <1> to <16>, wherein the half-value angle of the light diffusion film at an elongation rate of 40%, $H_{40}$, is 10° or more.

<18> The light diffusion film according to any one of <1> to <17>, wherein the half-value angle of the light diffusion film at an elongation rate of 60%, $H_{60}$, is 10° or more.

<19> The light diffusion film according to any one of <1> to <18>, wherein the half-value angle of the light diffusion film at an elongation rate of 80%, Heo, is 10° or more.

EXAMPLES

The present invention will be more specifically described below using Examples and a Comparative Example. The present invention is not limited in any way by the following Examples.

[Measurement Methods]
<Average Film Thickness of Light Diffusing Layer, T>

For cross sections of a light diffusion film, cross sections at 5 locations were checked at 2,000× magnification by an SEM (Scanning Electron Microscope), and the average value at a total of 50 locations, 10 locations in each cross section, was taken as the average film thickness of the light diffusing layer, T.

<Half-Value Angle>

Measurement was performed by an optical scattering measuring instrument "MiniDiff V2" (product name, manufactured by Light Tec). A diffusing film was allowed to stand on the transmitted light source so that light enters from the diffusing layer, and the light receiving portion was placed on the diffusing film. Measurement conditions in which the incident light source was G (525 nm), and the angle of incident light was perpendicular to the diffusing film were used, and the intensity of transmitted light in the measurement field of view (−75° to 75°) was measured. The angle at intensity $I_{1/2}$ half the intensity of front light, $I_0$, was measured, and the angle range in which light having intensities equal to or more than the half was radiated was calculated and taken as the half-value angle (°).

<Total Light Transmittance and Haze>

The total light transmittance (Tt) and the Haze were measured by a measurement method in accordance with JIS K7361-1: 1997 and a measurement method in accordance with JIS K7136: 2000, respectively, by a haze meter "NDH4000" (product name, manufactured by Nippon Denshoku Industries Co., Ltd.) with the light diffusing layer of each light diffusion film being a light entering surface.

[Manufacture of Light Diffusion Films]

Examples 1 to 7 and Comparative Example 1

Figure 5:
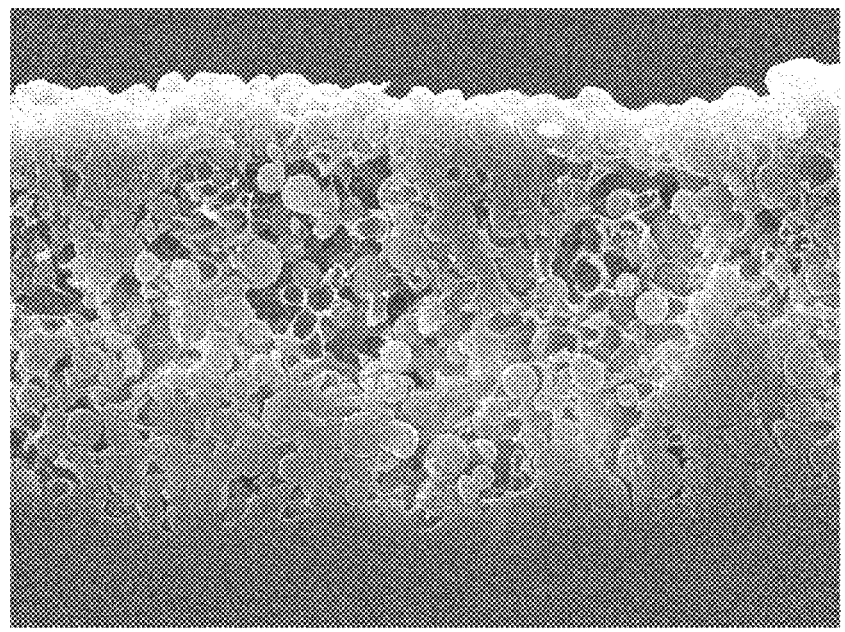
FIG. 5 is an SEM photograph of a cross section of a light diffusion film at an elongation rate of 0%.
Figure 6:
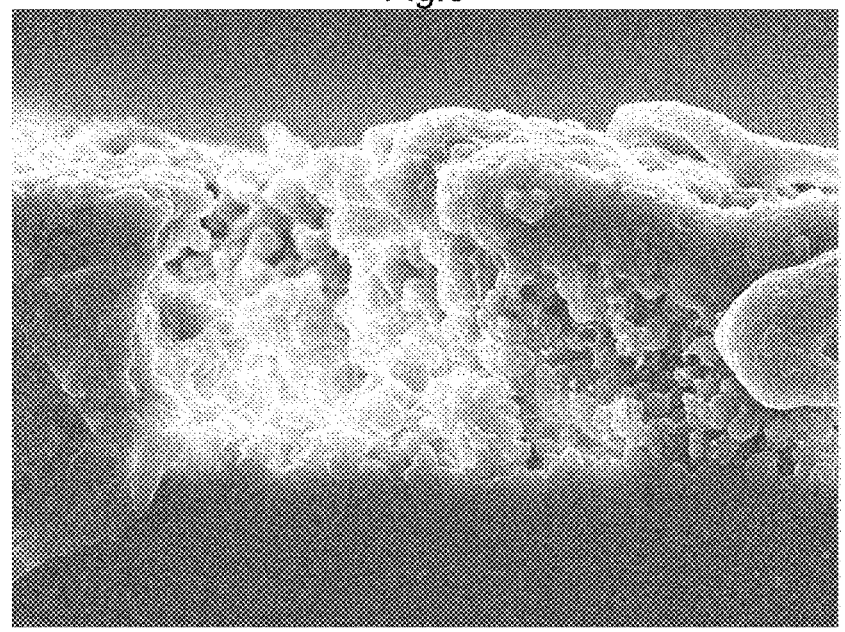
FIG. 6 is an SEM photograph of a cross section of the light diffusion film at an elongation rate of 40%.
Figure 7:
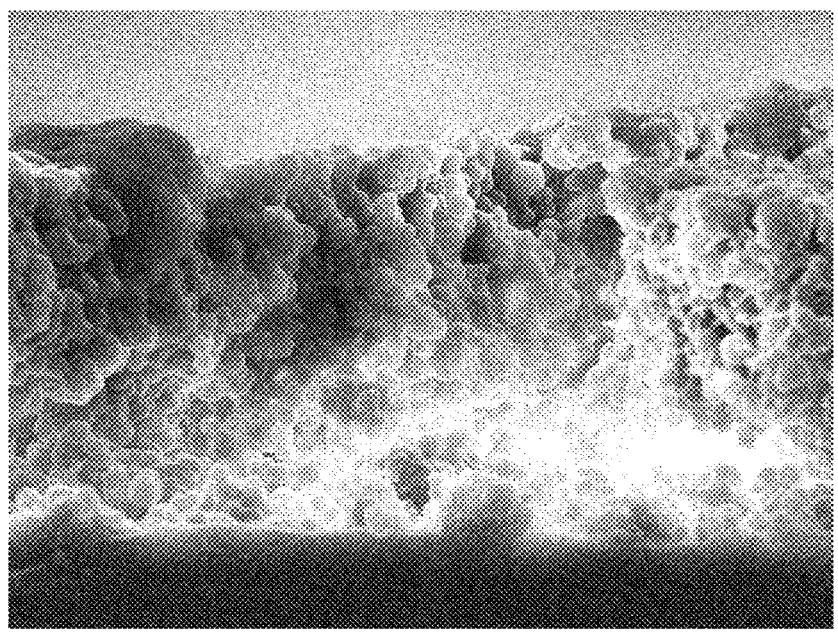
FIG. 7 is an SEM photograph of a cross section of the light diffusion film at an elongation rate of 80%.

Light diffusing particles and a resin binder shown in Table 1, and an appropriate amount of an organic solvent were mixed and stirred to obtain an application liquid for a light diffusing layer. Then, the application liquid was applied onto a base material film including a polycarbonate film having a thickness of 250 μm and a glass transition temperature of 150° C. by a bar coating method so that the thickness after drying was a value shown in Table 1, and the application liquid was dried to form a light diffusing layer to obtain each of the light diffusion films of Examples 1 to 7 and Comparative Example 1. SEM photographs of cross sections of the light diffusion film of Example 5 are shown in FIGS. 5 to 7. FIG. 5 is an SEM photograph of a cross section of the light diffusion film at an elongation rate of 0%. FIG. 6 is an SEM photograph of a cross section of the light diffusion film at an elongation rate of 40%. FIG. 7 is an SEM photograph of a cross section of the light diffusion film at an elongation rate of 80%.

Reference Example 1

An application liquid R1 for a light diffusing layer having the following formula was mixed and stirred. Then, the application liquid R1 was applied onto a support including a polyethylene terephthalate film "Lumirror T60" (product name, manufactured by Toray Industries Inc.) having a thickness of 250 μm by a bar coating method so that the thickness after drying was 5 μm, and the application liquid R1 was dried to form a light diffusing layer. Then, an application liquid for a back coat layer having the following formula was applied to the surface of the support opposite to the surface on which the light diffusing layer was formed, by the bar coating method so that the thickness after drying was 5 μm, and the application liquid was dried to form a back coat layer to obtain the light diffusion film of Reference Example 1.

(Application Liquid R1 for Light Diffusing Layer Coating)

| | |
|---|---|
| acrylic polyol resin (solids 50%, Tg 96° C., refractive index 1.51) | 6 parts by mass |
| acrylic polyol resin (solids 50%, Tg 19° C., refractive index 1.49) | 14 parts by mass |
| polyisocyanate (solids 60%) | 4 parts by mass |
| acrylic resin particles (average particle diameter 2 to 3 μm, refractive index 1.49) | 11 parts by mass |
| diluting solvent | appropriate amount |

(Application Liquid for Back Coat Layer)

| | |
|---|---|
| acrylic polyol resin (solids 50%, Tg 65° C., refractive index 1.49) | 10 parts by mass |
| polyisocyanate (solids 60%) | 2 parts by mass |
| acrylic resin particles (average particle diameter 5 μm, refractive index 1.49) | 0.1 parts by mass |
| diluting solvent | appropriate amount |

[Evaluation]
<Elongation Test>

As the evaluation of shape conformability, a tensile test was performed in accordance with JIS K7127: 1999 to measure the elongation rate of each film. Each film was cut into a rectangle 100 mm long by 25 mm wide to fabricate a sample. Next, marking was performed around the central portion of the sample excluding both ends at an interval of a length of 50 mm, and the sample was mounted in an apparatus in which a temperature control mechanism was mounted in a tensile tester "AGS-1kNX" (trade name, manufactured by SHIMADZU CORPORATION), so that the marking portions were not pinched by the chucks. The base material was set at 160° C., and the tensile test was performed at a chuck-to-chuck distance of 50 mm and a tensile speed of 200 mm/min. The above-described half-value angle was measured at elongation rates of 0%, 40%, 60%, 80%, and 120%, the total light transmittance was measured at elongation rates of 0% and 120%, and the haze was measured at elongation rates of 0% and 120%. They are shown in Table 1.

TABLE 1

| | | | Example 1 | Example 2 | Example 3 | Example 4 | Example 5 | Example 6 | Example 7 | Comparative Example 1 | Reference Example 1 |
|---|---|---|---|---|---|---|---|---|---|---|---|
| Application liquid (% by mass) | Light diffusing particles | Type | A-1 | A-1 | A-1 | A-1 | A-1 | A-2 | A-3 | A-1 | A-4 |
| | | Average particle diameter | 2 | 2 | 2 | 2 | 2 | 4 | 5 | 2 | 2 |

TABLE 1-continued

|  |  |  |  |  |  |  |  |  |  |  |
|---|---|---|---|---|---|---|---|---|---|---|
|  |  | t (μm) Amount (% by mass) | 67 | 61 | 50 | 33 | 70 | 67 | 67 | 67 | 47 |
|  | Resin binder | Type | B-1 | B-1 | B-1 | B-1 | B-1 | B-1 | B-1 | B-1 | B-2 |
|  |  | Amount (% by mass) | 33 | 39 | 50 | 67 | 30 | 33 | 33 | 33 | 53 |
| Light diffusing layer film thickness T (μm) |  |  | 8 | 8 | 8 | 8 | 8 | 13 | 17 | 4 | 5 |
| T/t ratio |  |  | 4.0 | 4.0 | 4.0 | 4.0 | 4.0 | 3.3 | 3.4 | 2.0 | 2.5 |
| Evaluation | Half-value angle (°) *1 | Elongation rate 0% | 43 | ° — | 43 | Change rate — | 41 | Change rate — | 32 | Change rate — | 50 |
|  |  | 40% | 50 | 16% | 49 | 14% | 41 | 0% | 31 | −3% | 51 |
|  |  | 60% | 49 | 14% | 48 | 12% | 41 | 0% | 30 | −6% | 48 |
|  |  | 80% | 49 | 14% | 46 | 7% | 40 | −2% | 29 | −9% | 46 |
|  |  | 120% | 43 | 0% | 41 | −5% | 38 | −7% | 26 | 19% | 39 |
|  |  | Evaluation Half-value angle (°) *1 | Change rate — | ° 20 | Change rate — | 16 | Change rate — | 37 | Change rate — | 10 | Change rate — |
|  |  | 2% | 20 | 0% | 17 | 6% | 42 | 15% | *2 | — |
|  |  | −4% | 20 | 0% | 17 | 6% | 38 | 4% | — | — |
|  |  | −8% | 20 | 0% | 18 | 13% | 27 | 27% | — | — |
|  |  | 22% | 20 | 0% | 18 | 13% | 22 | 41% | — | — |
| Total light transmittance (%) | 0% |  | 75.52 | 73.65 | 76.56 | 82.11 | 69.01 | 93.35 | 96.66 | 81.01 | — |
|  | 120% |  | 69.11 | 69.42 | 75.56 | 86.90 | 62.85 | 92.96 | 95.89 | 77.07 | — |
| Haze (%) | 0% |  | 98.59 | 99.33 | 99.29 | 99.15 | 99.40 | 97.25 | 96.20 | 99.23 | — |
|  | 120% |  | 98.38 | 99.19 | 98.92 | 98.92 | 99.27 | 97.49 | 96.98 | 98.23 | — |

*1: % in the table represents an elongation rate.
*2: The light diffusing layer cracked, and therefore the measurement was stopped. (Light Diffusing Particles)
A-1: benzoguanamine particles (average particle diameter ($D_{50}$) 2 μm, refractive index n = 1.67, specific gravity 1.4 g/cm$^3$, melting point 225° C. or more)
A-2: styrene particles (average particle diameter ($D_{50}$) 4 μm, refractive index n = 1.59, specific gravity 1.1 g/cm$^3$, decomposition temperature 250 to 270° C.)
A-3: acrylic particles (average particle diameter ($D_{50}$) 5 μm, refractive index n = 1.49, specific gravity 1.1 g/cm$^3$, decomposition temperature 250 to 270° C.)
A-4: acrylic particles (average particle diameter ($D_{50}$) 2 μm, refractive index n = 1.49, specific gravity 1.1 g/cm$^3$, decomposition temperature 250 to 270° C.) (Resin Binders)
B-1: acrylic resin (refractive index n = 1.49, specific gravity 1.1 g/cm$^3$, glass transition temperature 100° C.)
B-2: acrylic thermosetting resin (refractive index n = 1.49, specific gravity 1.1 g/cm$^3$)

From the results of the Examples and the Comparative Example, it is found that according to the light diffusion film according to this embodiment, a decrease in the half-value angle can be suppressed even after processing with a high elongation rate.

According to the comparison between Example 1 and Comparative Example 1, it is found that when the T/t ratio is within the predetermined range, a decrease in the half-value angle can be suppressed even after processing with a high elongation rate. From the results of Example 1 to Example 5, it is found that in a wide range of the content of light diffusing particles, the half-value angle is maintained even with elongation processing. According to Examples 6 and 7, it is found that even with light diffusing particles containing a styrene resin or an acrylic resin, according to the light diffusion film according to this embodiment, a decrease in the half-value angle can be suppressed even after processing with a high elongation rate.

INDUSTRIAL APPLICABILITY

According to the light diffusion film of the present invention, a decrease in the half-value angle can be suppressed even after processing with a high elongation rate. The light diffusion film of the present invention can be disposed on a surface of a transparent resin for use, and can be used for LED lighting apparatuses such as the headlights of automobiles.

The invention claimed is:

1. A light diffusion film comprising a base material film and a light diffusing layer, the light diffusing layer containing light diffusing particles having an average particle diameter t of 0.4 μm or more and a resin binder,
   wherein a ratio (T/t) of an average film thickness T of the light diffusing layer to the average particle diameter t of the light diffusing particles, is 3.0 or more,
   wherein, when the light diffusion film is used for thermoforming, a half-value angle $H_{40}$ of the light diffusion film at an elongation rate of 40% is within a range of a value 25% lower than a value of a half-value angle $H_0$ before elongation, or more and a value 25% higher than the value of the half-value angle $H_0$ before elongation, or less, and
   wherein an amount of the light diffusing particles loaded is 30% by mass or more and 80% by mass or less based on a total amount of solids in the light diffusing layer.

2. The light diffusion film according to claim 1, wherein the light diffusing particles have an average particle diameter t of 0.5 to 10.0 μm.

3. The light diffusion film according to claim 2, wherein the light diffusing layer has an average film thickness T of 1.5 to 30 μm.

4. The light diffusion film according to claim 1, wherein the light diffusing layer has an average film thickness T of 1.5 to 30 μm.

5. The light diffusion film according to claim 1, wherein the light diffusing layer contains voids inside.

6. The light diffusion film according to claim 1,
wherein an amount of the light diffusing particles loaded is 50% by mass or more and 75% by mass or less based on a total amount of solids in the light diffusing layer.

7. The light diffusion film according to claim 1,
wherein the light diffusing layer is exposed on an outermost surface.

8. The light diffusion film according to claim 1,
wherein the light diffusing particles include thermoplastic resin particles or thermosetting resin particles.

9. The light diffusion film according to claim 1,
wherein the resin binder includes a thermoplastic resin.

10. The light diffusion film according to claim 1,
wherein the half-value angle $H_{40}$ of the light diffusion film at an elongation rate of 40% is 10° or more.

* * * * *